United States Patent
Farleigh

(10) Patent No.: US 6,208,388 B1
(45) Date of Patent: Mar. 27, 2001

(54) CHANNEL RESPONSIVE TELEVISION INPUT SIGNAL INTERFACE CIRCUIT AND METHOD

(75) Inventor: Scott Eugene Farleigh, Denver, CO (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 08/953,877

(22) Filed: Oct. 18, 1997

(51) Int. Cl.[7] ................................................ H04N 5/268
(52) U.S. Cl. ........................ 348/705; 348/706; 348/555
(58) Field of Search ..................................... 348/705, 706, 348/731, 734, 723, 553, 554, 555, 13; 455/428; H04N 5/268

(56) References Cited

U.S. PATENT DOCUMENTS

| | | | |
|---|---|---|---|
| 4,037,250 | * 7/1977 | McGahan et al. | 348/159 |
| 4,700,230 | * 10/1987 | Pshtissky et al. | 348/159 |
| 4,858,011 | * 8/1989 | Jackson et al. | 348/705 |
| 4,996,597 | * 2/1991 | Duffield | 348/705 |
| 5,115,426 | * 5/1992 | Spanke | 370/354 |
| 5,231,494 | * 7/1993 | Wachob | 348/385 |
| 5,325,131 | * 6/1994 | Penney | 348/706 |
| 5,343,193 | * 8/1994 | Shoda et al. | 340/825.79 |
| 5,438,375 | * 8/1995 | Sasabe et al. | 348/706 |
| 5,512,963 | * 4/1996 | Mankovitz | 348/725 |
| 5,541,670 | * 7/1996 | Hanai | 348/705 |
| 5,557,342 | * 9/1996 | Eto et al. | 348/706 |
| 5,568,204 | * 10/1996 | Takamori | 348/705 |
| 5,574,440 | * 11/1996 | Kurtz | 340/825.57 |
| 5,684,543 | * 11/1997 | Kobayashi | 348/705 |
| 5,754,255 | * 5/1998 | Takamori | 348/705 |
| 5,808,693 | * 9/1998 | Yamashita et al. | 348/554 |
| 5,838,393 | * 11/1998 | Simpson et al. | 348/705 |
| 5,896,181 | * 4/1999 | Takamori | 348/705 |
| 5,898,900 | * 4/1999 | Richter et al. | 348/731 |
| 5,907,371 | * 5/1999 | McNay et al. | 348/706 |
| 5,917,557 | * 6/1999 | Toyoda | 348/705 |
| 5,923,384 | * 7/1999 | Enomoto et al. | 348/705 |
| 5,963,842 | * 10/1999 | Kinugawa | 348/731 |
| 6,031,878 | * 2/2000 | Tomasz et al. | 348/731 |

* cited by examiner

*Primary Examiner*—John Peng
*Assistant Examiner*—Jean W. Désir
(74) *Attorney, Agent, or Firm*—Carmen B. Patti; Wildman, Harrold, Allen & Dixon

(57) ABSTRACT

An automatic channel responsive television input source selection switch couples output signals from a selected one of a plurality of input television input source interface circuits to a television in accordance with a user channel selected with a user channel selector manually controlled through one of a remote control unit and interface and a manual interface. A look-up table memory stores each of the possible user channel numbers along with an associated input signal source channel and an indication of signal source identity, such as indication of a direct broadcast satellite television signal source, a public television broadcast source and a security camera source. The switch based on the associations stored in the look-up memory selects the associated video input signal source and provides an indication of the associated source channel number to a tuner included in the selected interface. An on-screen user channel selection program enables the user to change the channel selections associated with different sources and source channels.

18 Claims, 9 Drawing Sheets

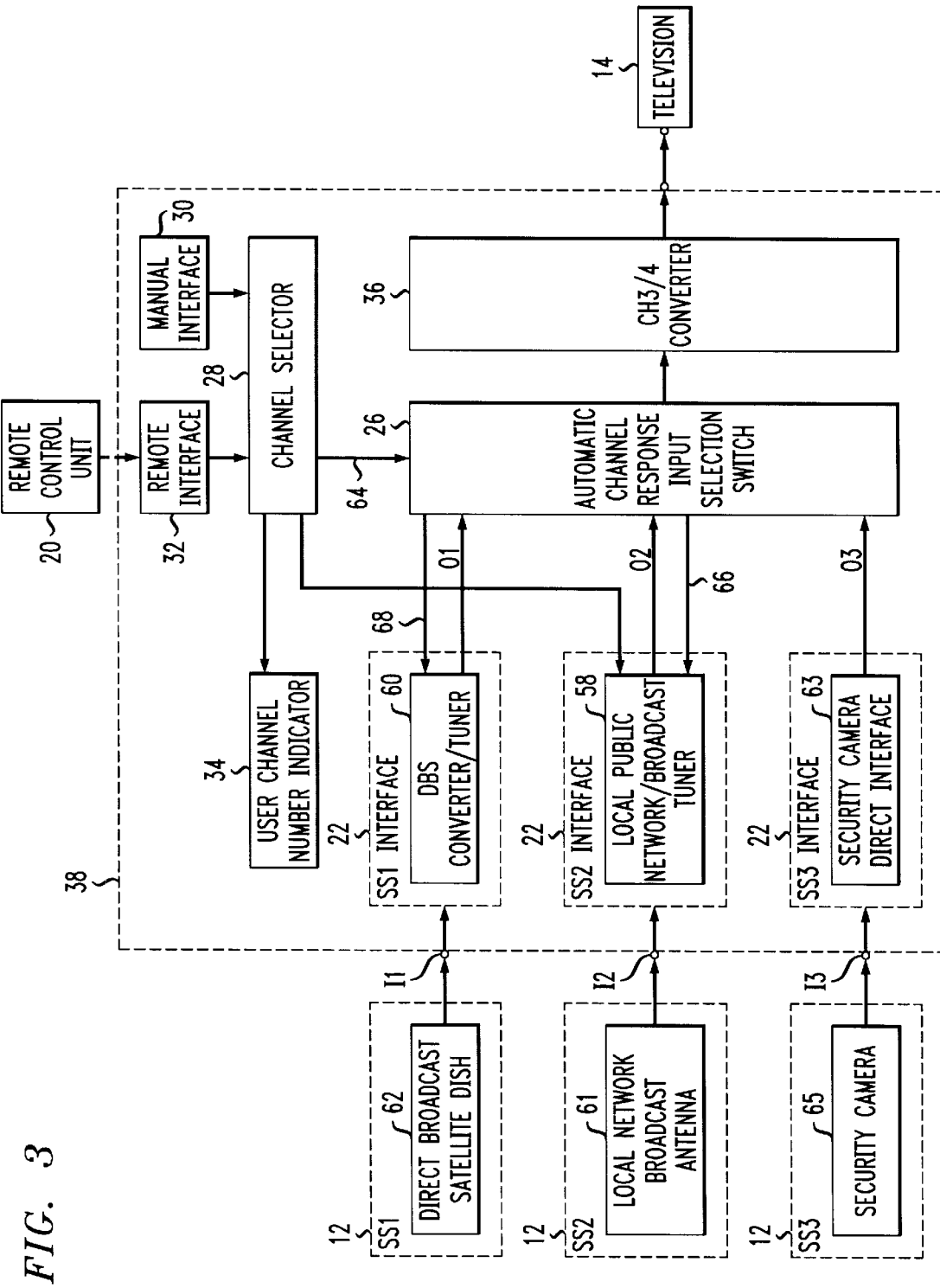

FIG. 4

| USER CHANNEL NUMBER | LOCAL STATION CHANNEL NUMBER | DBS STATION CHANNEL NUMBER | OTHER |
|---|---|---|---|
| 1 | – | DBS1 | |
| 2 | LN2(CBS) | | |
| 3 | – | – | SECURITY |
| 4 | | DBS2 | |
| 5 | LN5(NBC) | | |
| 6 | | DBS3 | |
| 7 | LN7(ABC) | | |
| 8 | | DBS4 | |
| ... | | | |
| 69 | LN69 | | |
| ... | | | |
| N | | DBS(N-4) | |

70 — 72 — 74 — 76

CHANNEL RESPONSIVE TELEVISION INPUT SIGNAL INTERFACE CIRCUIT AND METHOD

BACKGROUND OF THE INVENTION

This invention generally relates to television and more particularly apparatus and methods for selectively providing video input signals to television from a plurality of different television signal sources.

Users of televisions today often have available to them multiple sources of televisions signals which they wish to couple to a single television or television monitor for selective using. Such sources include commercial cable television sources, cable security camera sources, local network broadcast television sources received via land based antennas and more recently direct broadcast satellite sources received via satellite dish antennas.

Reception of commercial cable television signals are sent in coded format and must be decoded by converter circuits or so-called converter boxes. These converter boxes contain circuits which selectively tune in different source channels in response to direct or remote selection by the user. The channel numbers associated with the different channels are pre-established by the cable television service provider and cannot be altered or programmed by the user. However, such converter boxes are known to have the ability to allow on-screen program preselection of so-called "favorite channels" which are less in number than the total number of available channels. Operation of a favorite channel button switch on the remote control unit causes a channel selector to scan only the preselected favorite channels while skipping over the other channels.

Likewise, direct broadcast satellite, or DBS, television signals received at a user satellite dish antenna must be decoded and selectively tuned into the selected channels and such DBS systems employ a converter box like that employed with the cable television service providers. Like in cable television service, the direct broadcast satellite television service providers preselect which channel numbers displayed on the converter box correspond to which source channels or stations and these preselections cannot be changed by the user or viewer.

Other sources of television input signals do not require decoding, such as land based local network public broadcast signals, also have preselected channels assigned to them by the Federal Communication Commission, or FCC. Although cable decoders are known to provide tuners that are adjustable with respect to the displayed channel assigned to any given public broadcast network channel, employing a user channel number for a public broadcasting channel which is different than the network channel number is confusing and to be avoided.

It is also sometimes desired to couple other cable sources, such as television security cameras, other internal programming cable sources, or the like.

Many televisions have only one antenna, or "video in", input terminal, and in order for the converter boxes to control tuning, the television is tuned to a particular open channel on which local public broadcast stations do not broadcast and are not received, such as channel-3 and channel-4, on which all the cable channels signals are modulated.

Problems or difficulties develop when it is desired to convert multiple television sources to a single television monitor. For instance, due to FCC Regulations, direct broadcast satellite services are not permitted to include as part of their service local network programming such as local programming from CBS, NBC and ABC affiliates. A user of direct broadcast satellite television services must employ a separate mechanical switch box, employ a switch box built into a converter box or physically switch cable inputs to their television in order to change between a local public broadcast network program and programming on the direct broadcast satellite channels. In any event, the input is connected to the local public broadcast, the tuner of the television must be used to tune in the public broadcast stations.

SUMMARY OF THE INVENTION

The principal object of the present invention is to provide a channel responsive television input signal interface circuit and methods which overcome the disadvantages of known apparatus and methods for employing multiple television services with a single television.

In the preferred embodiment, a television input signal interface circuit has a plurality of input connectors for connection to a plurality of different sources of television input signals, an output connector for connection to an input terminal of a television monitor, a user channel selector for selecting a plurality of different channels and means responsive to the user channel selector for automatically selectively coupling the television input signals from different ones of the plurality of input connectors to the output connector.

In accordance with the preferred method of practicing the invention, a plurality of television signal input sources are interfaced with a television monitor by the steps of (1) preassociating each of a plurality of selectable user channels with a selected one of the plurality of television input signal sources, (2) selecting one of the plurality of user channels as a selected channel and (3) automatically coupling to the television input signals from the television signal source preassociated with the selected user channel.

BRIEF DESCRIPTION OF THE DRAWINGS

The foregoing objects and advantageous features of the invention will be explained in greater detail and others will be made apparent from the detailed description of the preferred embodiment of the present invention which is given with reference to the several figures of the drawing, in which:

FIG. 3 is a functional block diagram of a preferred embodiment of the channel responsive interface circuit of FIG. 2 in which the television input signal source includes a direct broadcast satellite dish antenna and a local network broadcast antenna and a security television camera;

FIG. 4 is an exemplary look-up table stored in association with the automatic channel responsive input selection switch functional block of FIG. 3 in which the plurality of television input signal sources includes a direct broadcast satellite source, a local broadcast network source and a security camera source;

DETAILED DESCRIPTION

Figure 1:
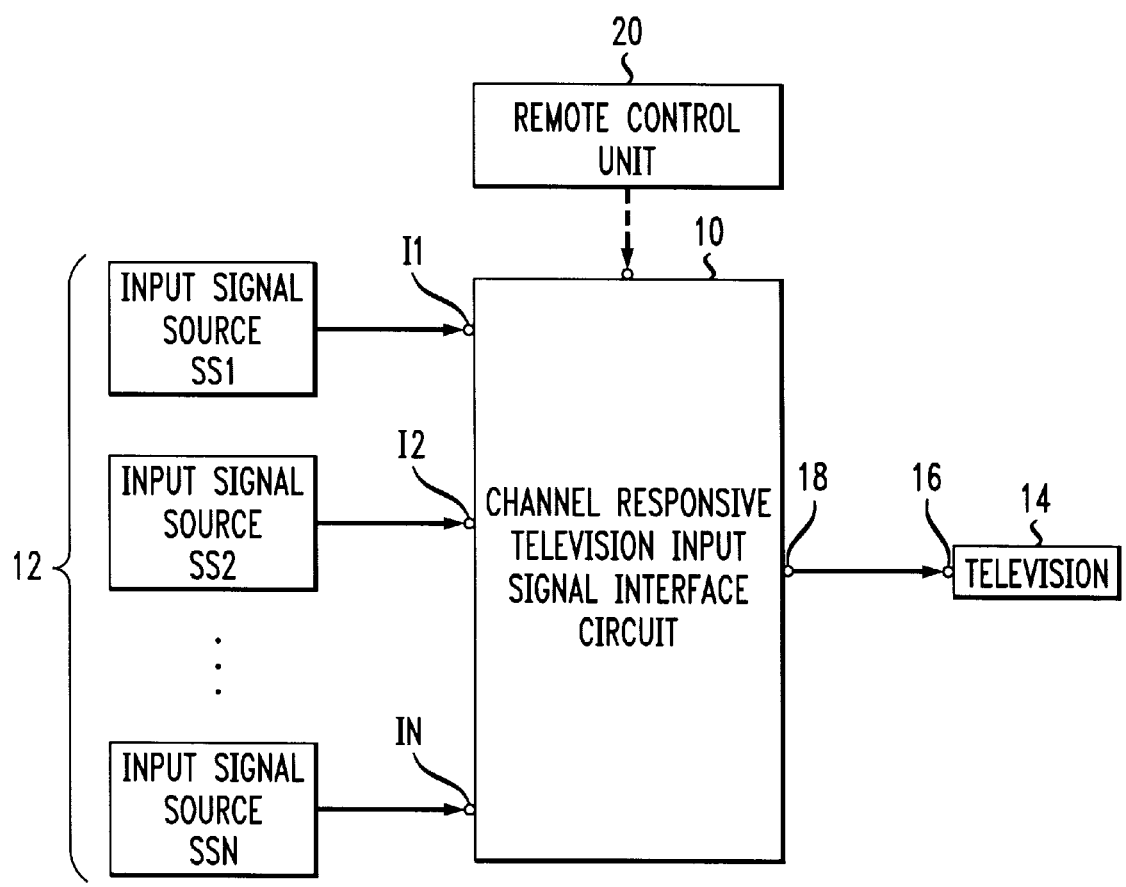
FIG. 1 is a functional block diagram of the preferred embodiment of the channel responsive television input signal interface circuit as employed to interface a plurality of input signal sources with a single television.

Referring to FIG. 1, the preferred embodiment of the channel responsive television input signal interface circuit 10 is seen to have a plurality of input connectors 12 respectively labeled input signal source SS1 through SSN, respectively coupled to a plurality of input connectors I1 through IN, where N is an integer greater than two. A television or television monitor 14 has an input 16 connected to an output connector 18 of the input signal interface circuit 10 to receive television input signals from said plurality of input signal sources 12 labeled SS1 through SSN. A remote control unit 20 remotely communicates with the input signal interface circuit 10 to select different user channels and to remotely perform other functions such as volume control and on-screen programming.

Figure 2A:
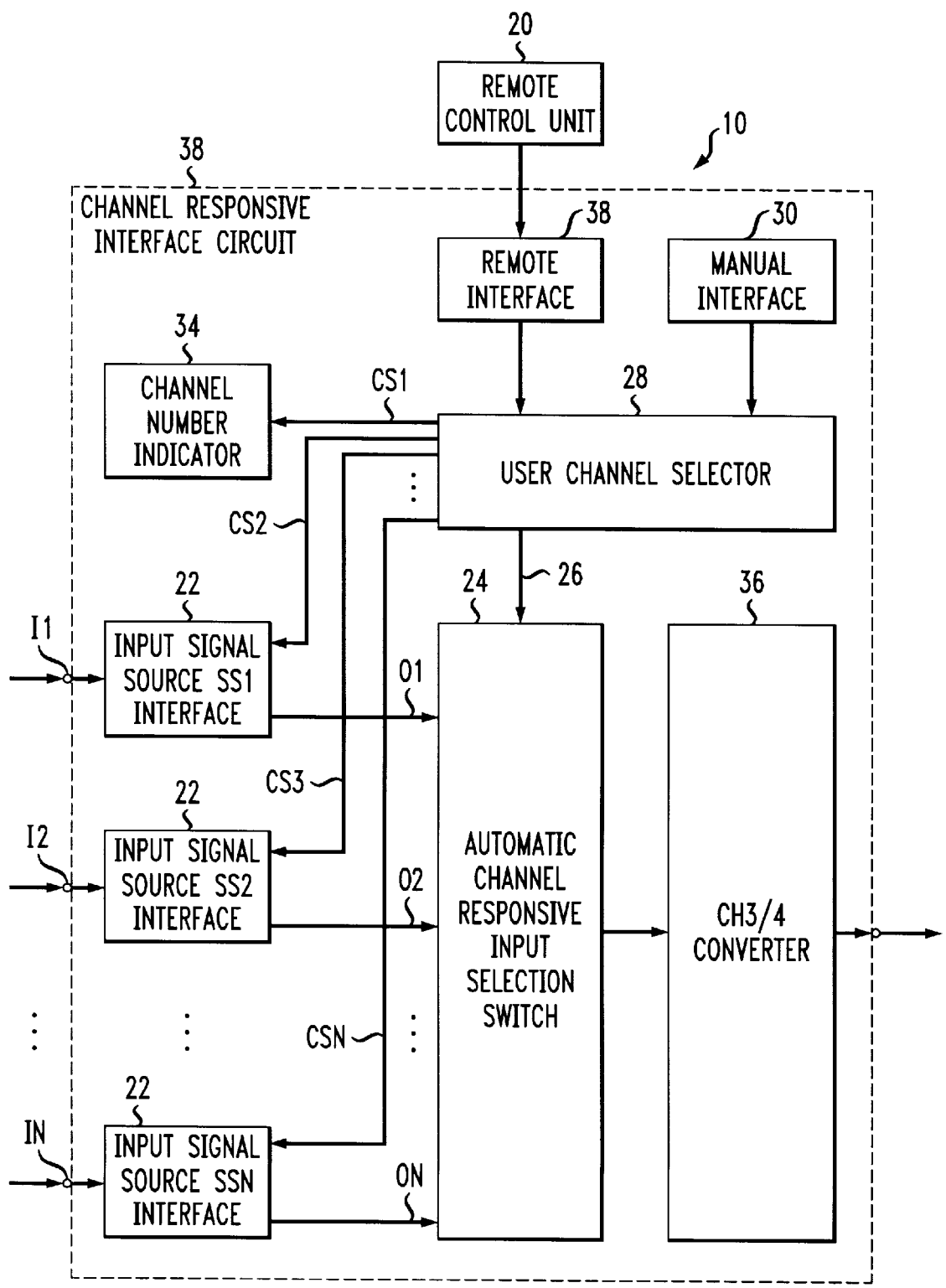
FIG. 2A is a functional block diagram of the channel responsive interface circuit of FIG. 1.

Turning now to FIG. 2A, the preferred embodiment of the channel responsive interface circuit 10 is seen to include a plurality of input signal source interface circuits 22, labeled input signal source SS1 through SSN with inputs respectively coupled to the plurality of input connectors I1 through IN. The respective outputs O1 through ON of all the plurality of interface circuits SS1 through SSN are individually connected to an automatic channel responsive input selection switch, or input selection switch, 24. The input selection switch 24 also has an input 26 for receiving channel selection control signals from a channel selector 28.

The channel selector 28 has a plurality of outputs CS1 through CSN, respectively connected to input signal source interface circuits 12 labeled SS1 through SSN, respectively, to provide them with channel selection information.

The channel selector 28 is controlled alternatively via a manual interface 30 and a remote interface 32, both of which are independently connected to channel selector 28 to provide control signals to cause the channel selector 28 to choose a desired user channel. The remote control unit 20 communicates with the remote interface 32 preferably via infrared signals. The channel selector 28 stores the selected user channel number and provides it to a channel number indicator 34 which then displays the selected user channel number for viewing by the user.

In accordance with the principal feature of the invention, the input selection switch 24 responds to the control signal applied to its input 26 from the channel selector which represents the user channel number stored in the channel selector 28 to automatically selectively couple the video input signal on only one of the plurality of outputs O1 through ON from input signal source interface circuit 22 which has been previously associated or preassociated with the selected user channel number to a channel 3/4 converter 36. The preassociation is established preferably by means of on-screen programming by the user, preferably by the method described below with respect to FIG. 5. Alternatively, user channel numbers corresponding to local public broadcast network channel numbers, such as channel numbers 2, 5 and 7 for local broadcast network stations broadcasting CBS, NBC and ABC network programs having the same channel numbers are preprogrammed and stored in a read only memory of the input selection switch 24.

The CH3/4 converter 36 converts intermediate frequency, or baseband, television signals from the selected input signal source interface circuit 22 which has been passed by the input selection switch 24 to the converter 36 to the carrier frequency of one of public broadcast channel CH3 and CH4 depending upon the position of a manual selection switch (not shown). Preferably, the tuner (not shown) of television monitor 14 is tuned to the one of channels CH3 and CH4 which is open, i.e. is not the frequency channel at which any local public television stations are broadcasting, in order to reduce interference. Once the tuner of the television 14 is tuned to the open frequency channel which has been selected, it is kept tuned to this frequency channel. The CH3/4 converter 36 provides all of the television input signals to the television antenna input 16, regardless of from which one of the input signal source interface circuits 22 the signals come, at the proper carrier frequency for the selected one of channels CH3 and CH4.

In this way, all channel selection and tuning is performed at the intermediate carrier frequency, or baseband, level independently of the tuner of television monitor 14. Consequently, all channel selection, regardless of source, is capable of being performed remotely from the remote control unit 20 via the remote interface 32. Converters, such as CH3/4 converter 36, have long been used to couple signals from video cassette recorders, cable television converters and direct broadcast satellite converters which have enabled remote control channel selection for such nonpublicly broadcast sources.

FCC regulations permit cable television service providers to include channels in their cable services which are also publicly broadcast by local television stations. However, not necessarily all such local public station channels are included in the cable service package; in such case, the cable converter box must be disconnected from the antenna input terminal of the television and the public broadcast antenna connected to the input terminal to enable the tuner of the television to tune in the local public broadcast stations. In the case of direct broadcast satellite service, service providers are specifically prohibited by FCC regulations from including any local public network broadcast stations; in such case, the user has no option but to manually switch the connectors to the television antenna input or use a manual A/B single pole cable switch, to switch the television input to the broadcast television antenna source and then use the tuner of the television 14 rather than the direct broadcast satellite dish antenna converter box to tune in the different broadcast stations. If the television tuner is remotely controlled, a second remote control unit in addition to the DBS converter remote unit is required. In either event, the converter remote is not capable of being used to remotely control tuning of noncable and nonsatellite public television broadcast.

Advantageously, in keeping with the present invention, such switching of the antenna input terminal 16, FIG. 1, from one service to another is avoided as well as is use of one tuner and remote control unit and converter box to select different channels of the cable or direct broadcast satellite service and use of another remote control unit or nonremote channel changer of the television 14 for selecting public broadcast signals. Additionally, in the case of a television without remote control channel selection, such remote control channel selection capability is provided by the remote control unit 20 of the input signal interface circuit 10 in the preferred embodiment of FIG. 3 in which one of the input signal source interface circuits includes a local public network public broadcast timer.

While use of the CH3/4 converter 36 is required, the details of the converter 36 form no part of the present invention. Likewise, the details of the remote control unit, the infrared remote interface 32, the manual interface 30 and the user channel selector 28 are well known and are not part of this invention. Preferably, all of the components of the channel responsive interface circuit shown in FIG. 2A are contained within a single housing 38.

Figure 2B:
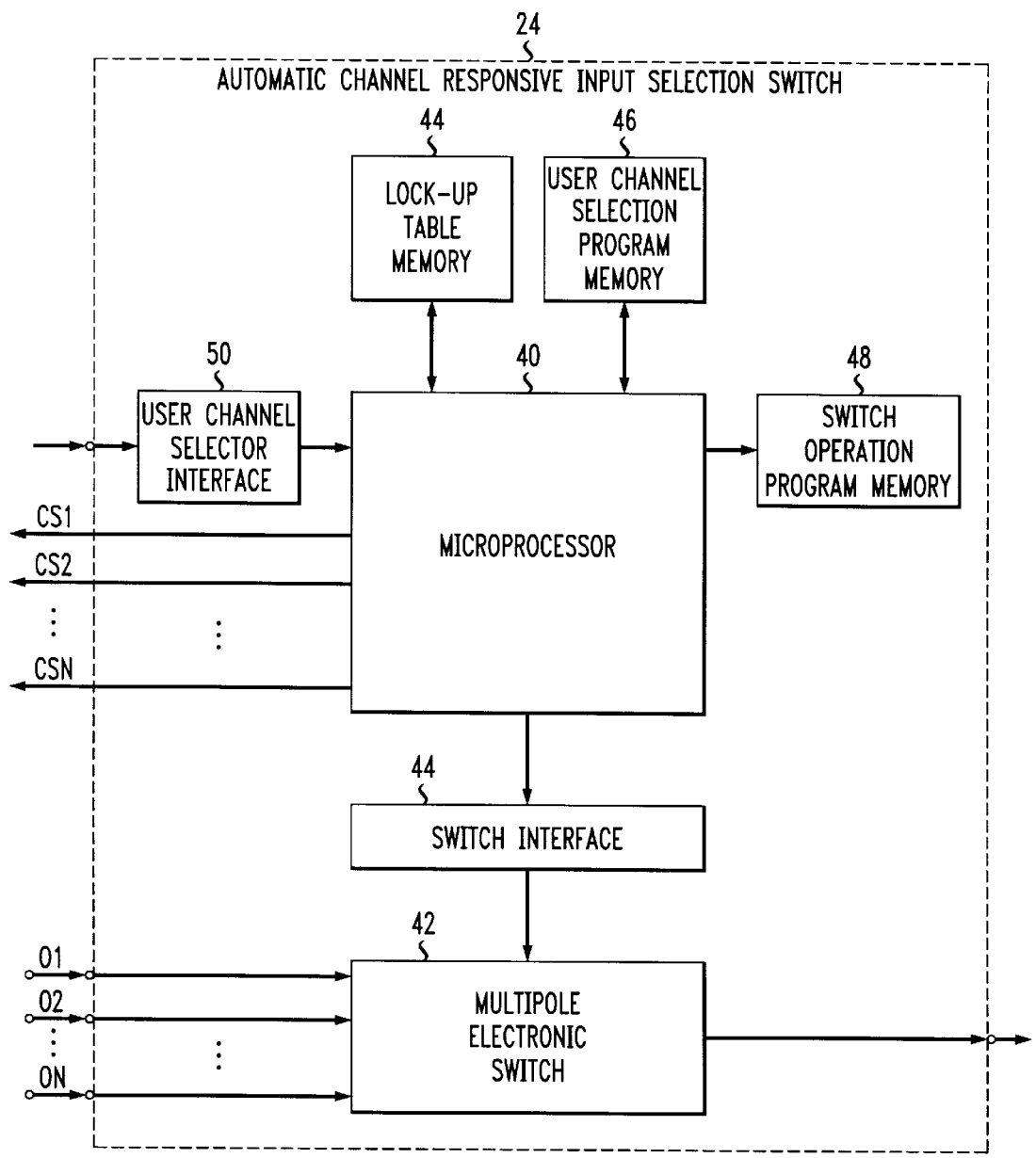
FIG. 2B is a functional block diagram of the input selection switch of FIG. 2A.
Figure 5A:
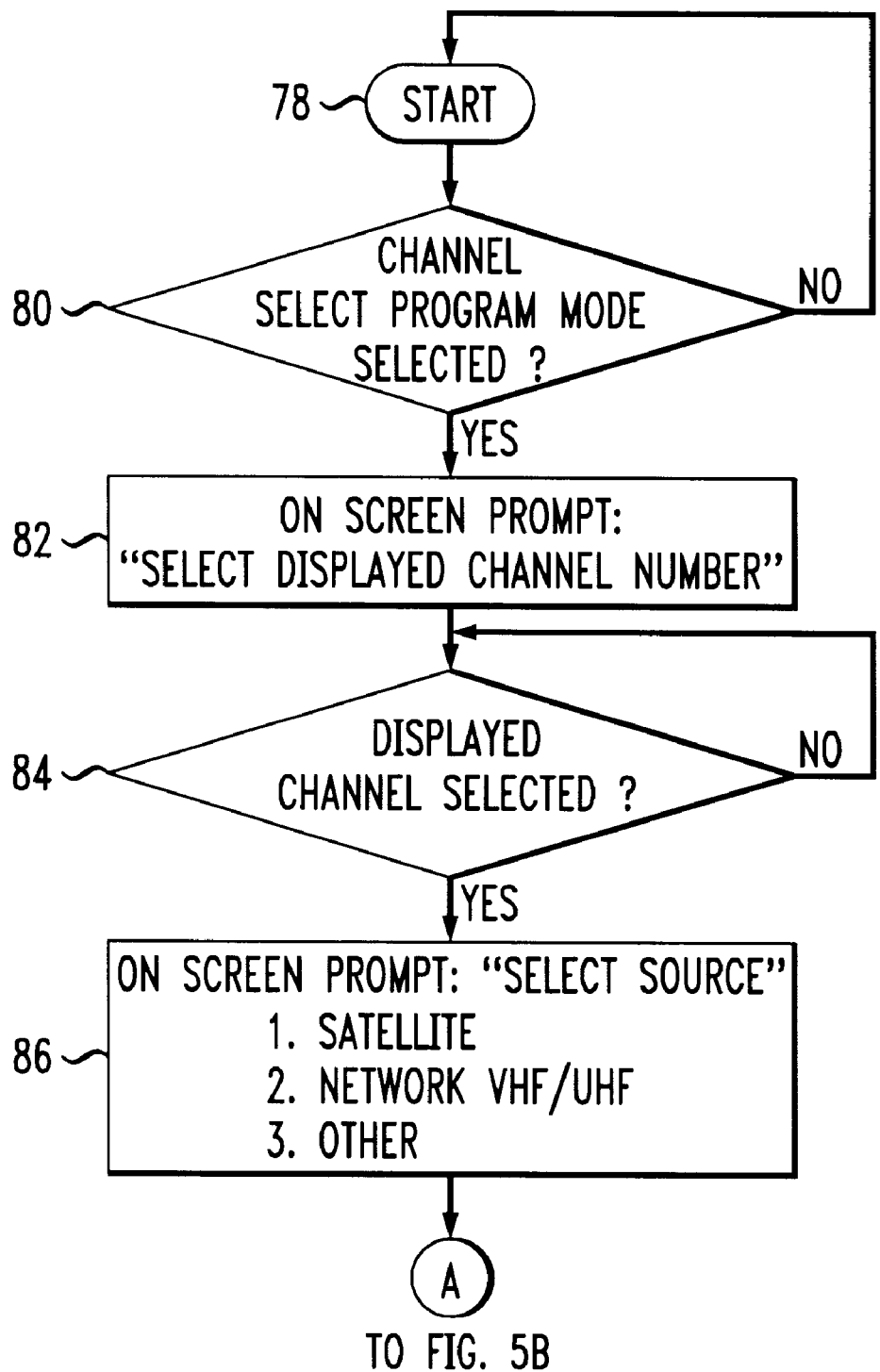
FIGS. 5A, 5B and 5C form a composite flow chart of the preferred method of programming the automatic channel responsive input selection switch to preselect an association between the user channel with the different sources and their associated source channels.
Figure 5B:
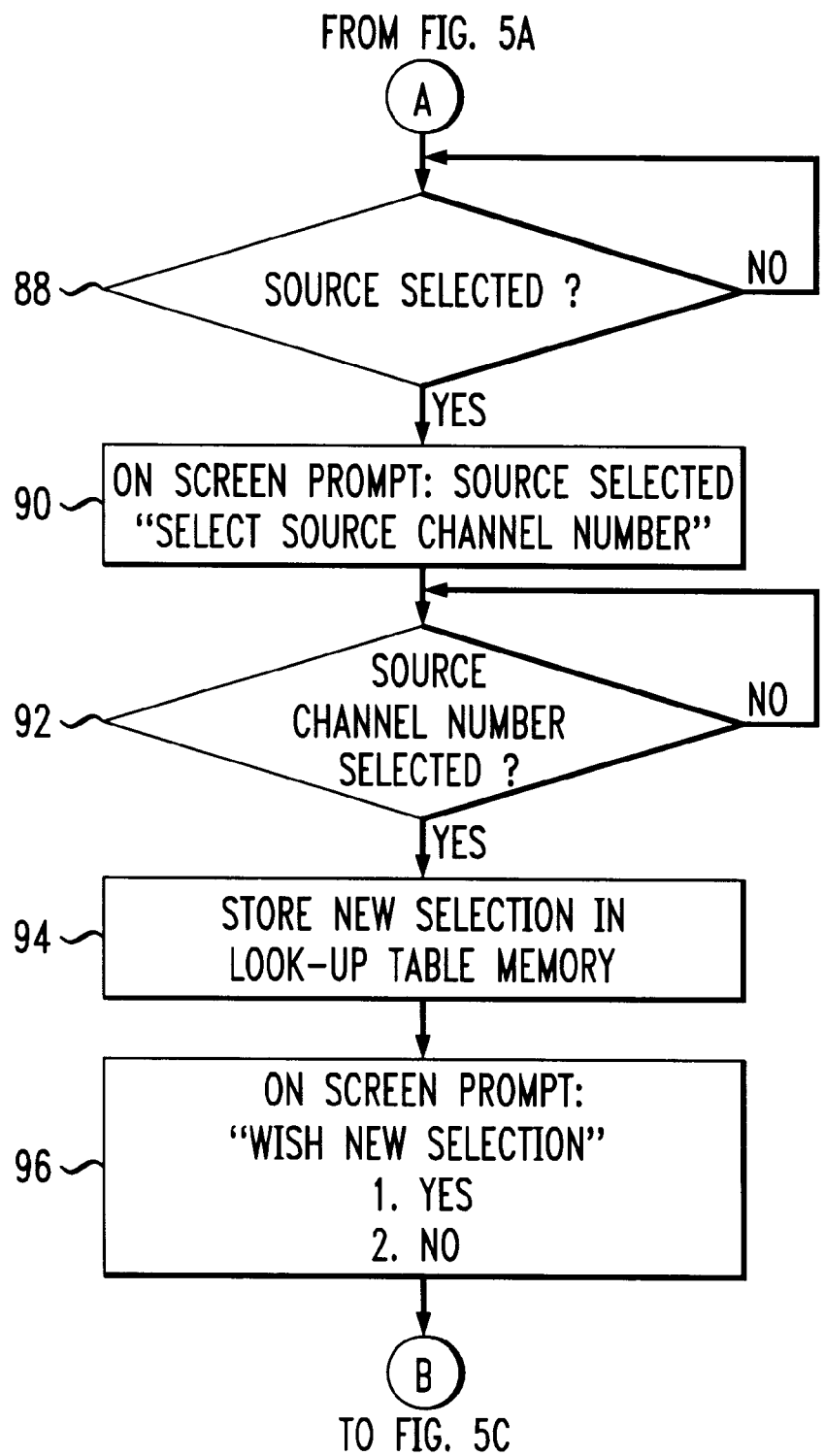
Figure 5C:
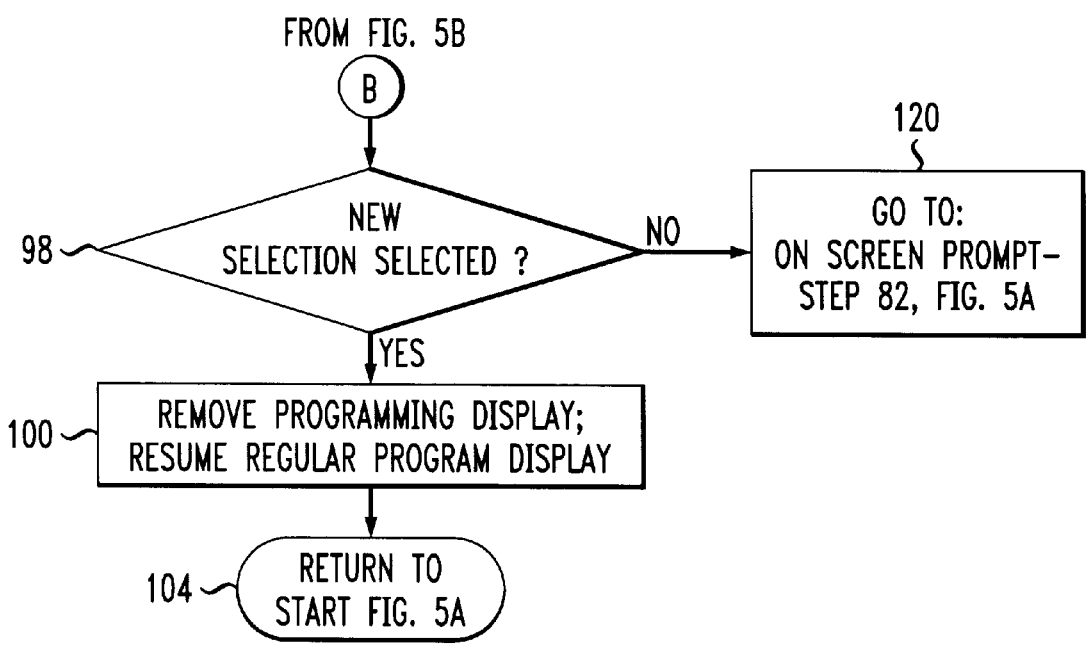
Figure 6:
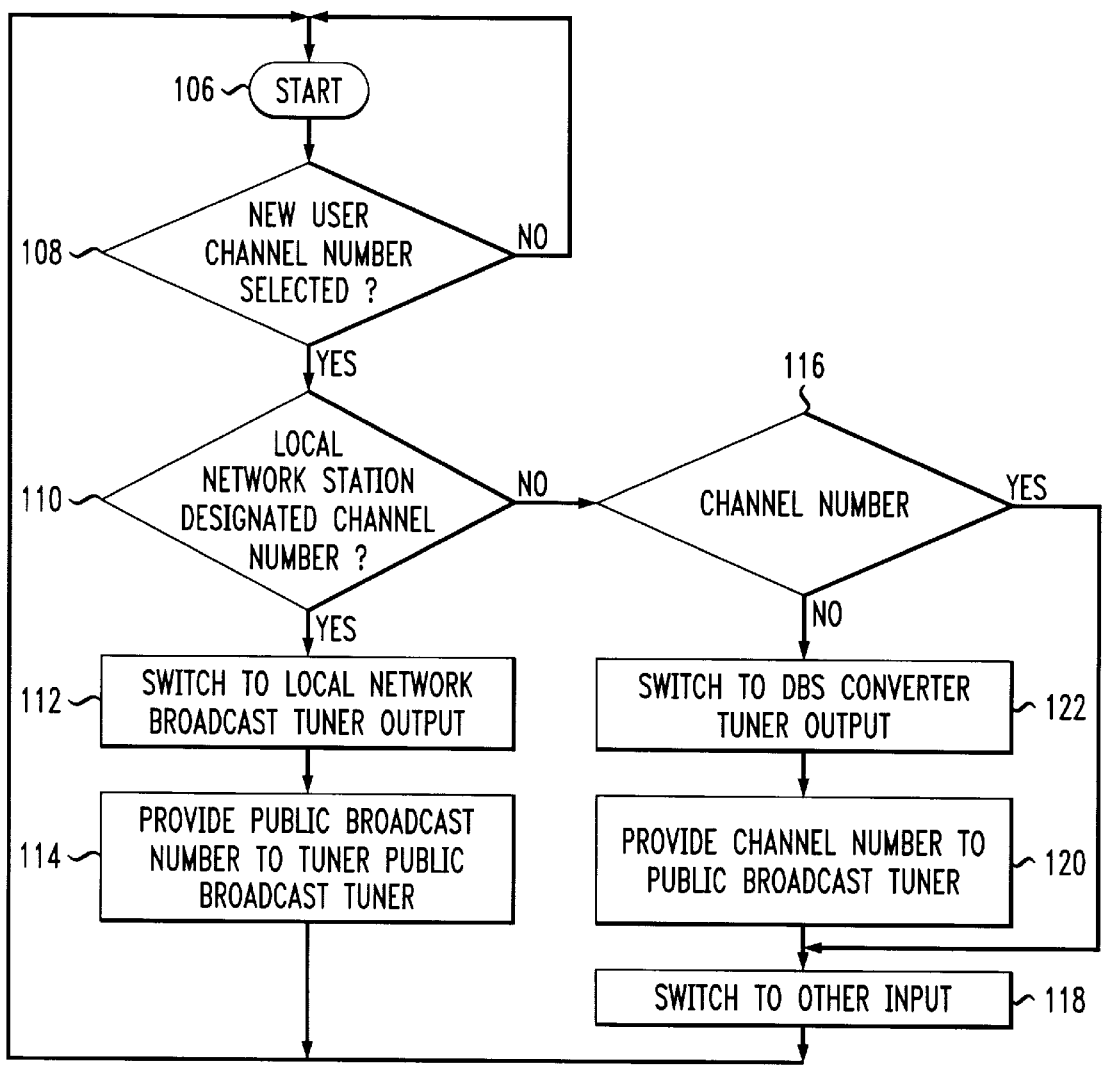
FIG. 6 is a flow chart of the preferred method of operation of the automatic channel responsive switch of FIG. 3 in which three input sources include a direct broadcast satellite source, a local network broadcast source and another source, such as a security camera or other unknown programming source.

Referring to FIG. 2B, the preferred embodiment of automatic channel responsive input selection switch 24 is seen to include a microprocessor 40 for controlling a multipole electronic switch 42 through means of control signals from the microprocessor 40 and passed to the switch 42 via a switch interface 44. The multipole electronic switch 42 has a plurality of inputs respectively coupled with the outputs O1, O2 through ON of the input signal source interface circuits 22 labeled SS1, SS2 through SSN. The microprocessor 40 is also coupled with a look-up table memory 44 for storing the look-up table, such as shown in FIG. 4, and a user channel selection program memory 46 in which the user selection program of FIGS. 5A through 5C is stored. The input signal interface switch operation program of FIG. 6 is stored in a switch operation program memory 48. An indication of the user channel which has been selected by the user channel selector 28 is coupled to the microprocessor 40 through a user channel selector interface circuit 50.

The microprocessor uses the look-up table like that of FIG. 4 to select one of the associated source interface outputs O1, O2 through ON to pass to the CH3/4 converter 36 and television 18 in response to the indicated user channel for the user channel selector interface 50 in accordance with the program of FIG. 6. In the case of the three video input signal sources shown in FIG. 3, the switch operation is controlled in accordance with the flow chart of FIG. 6. For more video input signal sources, an extrapolation of the program of FIG. 6 is employed.

Referring to FIG. 3, in a form of the preferred embodiment of the channel interface circuit 10 of FIG. 2 which perhaps has the greatest utility due to the FCC regulation prohibiting direct broadcast satellite service providers from providing local network public broadcast channels, one of the input signal source interface 22 includes a local public broadcast tuner 58 preferably capable of tuning in channels CH2 through CH69. This tuner 58 has the same capability of tuning in public uncoded public broadcast of television signals as the television tuner has. When coupled to the television 14, tuned to a selected one of channel CH3 and CH4, through the automatic channel responsive input selection switch 24 and CH3/4 converter, the public broadcast channel selection is selected via channel selector 28. The channel selector 28 is capable of being controlled remotely via infrared remote interface 32 and remote control unit 20 to enable remote control of public broadcast channel selection even in the absence of a remote controlled channel selection capability present in the television 14, itself. As will be explained, this is achieved by programming the input selection switch to select the public broadcast tuner 58 as the input source for connection to CH3/4 converter 36 for all selected public broadcast channels. In such case, the signal source 12 connected to input I2 of the public broadcast tuner 58 is a local public broadcast television antenna 61 for receiving the public broadcast signals.

Preferably, the SS1 input signal source interface 22 connected to input terminal I1 includes a direct broadcast satellite, or DBS, converter and tuner 60. In such case, the SS1 television input signal source 12 is a direct broadcast satellite dish antenna 62. Preferably, the SS3 input signal source interface 22 connected to input terminal I3 includes a security camera direct interface circuit 63 with an input connected with a security camera 65, and an output 63 connected to the selection switch 24. The channel selector 28 provides an indication of the user selected channel on its output 64 to the input selection switch 26, which based on a stored association of user channel numbers, determines which one of the DBS converter/tuner 60 and the public broadcast tuner 58 to couple through to the CH3/4 converter. In addition, the input selection switch 26 determines which source channel is associated with the selected user channel and provides a control signal to the selected one of the SS1 and SS2 interface circuits, the public broadcast tuner 58 and the DBS converter/tuner 60 on outputs 66 and 68, respectively, including the source channel number to be tuned in that corresponds to the selected user channel number.

The appropriate one of the tuners responds to the source channel number indication to tune in the source channel. In the case of the public broadcast tuner 58, the broadcast channels CH 2 through CH 69 corresponding to the selected user channel number is tuned in. In order for there to be correspondence between local program listings for local public broadcast, the selected user channel number preferably is the same as the local public broadcast channel number. In the case of the DBS converter/tuner, again private program listing will employ DBS channel numbers and again, preferably, the selected user channel number corresponds to the DBS channel number. Preferably, when there is a conflict between designated channel numbers, the user will select the broadcast station designated number as the user channel number and assign a different user channel number for the DBS station.

Referring now to FIG. 4, the look-up table memory 44, FIG. 2B, in the form of the preferred embodiment of the invention of FIG. 3, stores a look-up table of all possible user channel numbers in column 70 in association with the corresponding source identity based on presence of an entry of one of the other columns 72, 74 and 76 of the source channel number. As shown in the exemplary table of FIG. 4, direct broadcast station DBS1 is associated with user channel number one while user channel number two is associated with local station channel number LN2 which is affiliated with the CBS television network. Also, in the case of a third input signal source SS3 including a security television camera, a third column 76 is provided to associate an input signal from the security television camera (not shown) with user channel number three.

Preferably, the look-up table stored in look-up table memory 44, FIG. 2, and illustrated in FIG. 4 is user programmable by means of an on-screen user channel selection program stored in user selection program memory 46, FIG. 2, as shown in FIGS. 5A, 5B and 5C. The program is preferably started by the user selecting the user channel selection program by actuating a special button switch on the remote control (not shown) for this special program. Alternatively, the user channel selection program is selected form a menu of programs for other programmable features. After the program start in step 78, in step 80 a determination is made as to whether the user has selected to enter a program mode for the channel selection program. Once the program mode is selected, in step 82 the input selection switch 26 provides a video signal to the CH3/4 converter 36 to produce an on-screen display on the television 14 of the message "SELECT DISPLAYED CHANNEL NUMBER", referring to the user channel number being stored in channel selector 28 and displayed by user channel number indicator 34. Once the displayed channel has been selected by user entries on a number keypad (not shown) on the remote control unit 20, in step 84 the program is passed to step 86 which results in preselection of another on-screen prompt, as shown in step 86. The program continues to step 88 through coupling junction A, and once the source is selected in step 88, FIG. 5B, in step 90, another on-screen prompt ask the user to select the desired source channel number. After the source channel number has been selected in step 92, in step 94 the new selection is stored in the look-up table memory 44, and in step 96 another on-screen prompt asks the user whether a new selection is desired.

Turning now to FIG. 5C which is coupled with FIG. 5B through a junction B, if a desire to make a new selection is indicated in step 98, in step 100 the program returns to step 82, FIG. 5A, and the above steps 80 through 96 are repeated. If no new selection is indicated in step 98, the program proceeds to step 102 in which the program selection on-screen display is removed and the regular video input signals from the selected source is provided to the television 14. Then, in step 104 the program returns to the start step 78, FIG. 5A.

Referring now to FIG. 6, the input selection switch 26 is preferably operated in accordance with the flow chart beginning with start step 106. Each time the user changes the user channel, i.e. selects a new user channel number in step 108, the look-up table is used in step 110 to make a determination as to whether the associated source 22 is a local publicly broadcast channel. If it is, in step 112 the input selection switch selects the output of the public broadcast tuner to pass to the CH3/4 converter 36, and in step 114, the public broadcast tuner 58 is provided with the public broadcast station channel number.

Referring to step 110, if in step 116 it is determined that the associated source channel number selected is not a public broadcast channel, a determination in step 114 is made as to whether the other source, or security camera source has been selected. If the other is selected, then the signal from the security camera is passed to the output connector 18, FIG. 1, in step 118. If the other is not selected in step 116, then in step 120, the input selection switch 26 couples the output of the DBS converter/tuner 60 to the CH3/4 converter 36, and in step 122 the switch 36 passes the associated DBS channel number to the DBS converter/tuner.

While a detailed description of the preferred embodiment of the invention has been given, it should be appreciated that many variations can be made thereto without departing from the scope of the invention as set forth in the appended claims.

What is claimed is:

1. A television input signal interface circuit, comprising:
   a plurality of input connectors for connection to a plurality of different sources of television input signals;
   an output connector for connection to an input terminal of A television monitor;
   a user channel selector for selecting a plurality of different channels;
   means responsive to the user channel selector for automically selectively coupling the television input signal from different ones of the plurality of input connectorS to the output connector including means for storing an association of each user channel with a preselected source channel;
   a direct broadcast satellite converter/tuner connected to one of the plurality of input connections for decoding and tuning encoded direct broadcast satellite television signals from a satelLite dish antenna into decoded tuned satellite signals prior to coupling to the output connector;
   a local network broadcast tuner connected to another one of the plurality of input connectors for tuning and coupling local network broadcast signals from the other one of the plurality of input connectors to the output connector; and
   means responsive to selection of a channel by said channel selector associated with a network broadcast channel to connect the local network broadcast tuner to the output connector; and
   means for passing the local network broadcast signal through the local public broadcast tuner and bypassing the direct broadcast satellite converter/tuner when a user channel associated with the local public broadcast is selected.

2. The television input signal interface of claim 1 in combination with a satellite dish antenna connected to one of the plurality of input connectors.

3. The television input signal interface circuit of claim 2 in combination with a local network antenna connected to another one of the plurality of input connectors.

4. The television input signal interface circuit of claim 3 in combination with a security television camera output connected to a third one of a plurality of input connectors.

5. The television input signal interface circuit of claim 1 in which said channel selector responsive means includes means for storing an association of each user channel with only one of the plurality of input connectors.

6. The television input signal interface circuit of claim 1 including
   a plurality of tuners respectively connected to at least some of the plurality of input connectors, respectively, and
   means for controlling at least one of the tuners to tune in the source channel associated with the user channel when the user channel is selected.

7. A television input signal interface circuit, comprising:
   a plurality of input connectors for connection to a plurality of different sources of television input signals;
   an output connector for connection to an input terminal of a television monitor;
   a user channel selector for selecting a plurality of different channels;
   means responsive to the user channel selector for automatically selectively coupling the television input signals from different ones of the plurality of input connectors to the output connector including means for storing an association of each user channel with a preselected source channel;
   a direct broadcast satellite converter/tuner connected to one of the plurality of input connections for decoding and tuning encoded direct broadcast satellite television signals from a satellite dish antenna into decoded tuned satellite signals prior to coupling to the output connector;
   a local network broadcast tuner connected to one another of the plurality of input connectors for tuning and coupling uncoded tuned network broadcast signals from the other one of the plurality of input connectors to the output connector; and a user channel selector, and in which
said user channel selector responsive means includes an automatic channel responsive input selection switch with
a pair of inputs respectively coupled to the direct broadcast satellite converter/tuner and the network broadcast tuner, respectively, and
means responsive to the channel selector for switching the signals from only a selected one of said pair of switch inputs to the output connector depending upon which one of a plurality of different user channel numbers has been selected by the channel selector.

8. The television input signal interface circuit of claim 7 including a converter interposed between the automatic channel responsive input selection switch and the output connector to convert the frequency of the signal from the selected one of both the direct broadcast satellite television input signals and the network broadcast television input signals to a frequency of an open channel to which the television monitor is tuned.

9. The television input signal interface circuit of claim 8 in which both said direct broadcast satellite converter/tuner and the local network broadcast tuner are responsive to the channel selector to selectively tune in television signals of different frequencies associated with different source channels from both the broadcast satellite television signal and the network broadcast television signal.

10. The television input signal interface circuit of claim 8 including
a remote control unit, and
a remote interface circuit for controlling signals from the remote control unit to control signals applied to the channel selector.

11. A television input signal interface circuit, comprising:
a plurality of input connectors for connection to a plurality of different sources of television input signals;
an output connector for connection to an input terminal of a television monitor;
a user channel selector for selecting a plurality of different channels; and
means responsive to the user channel selector for automatically selectively coupling the television input signals from different ones of the plurality of input connectors to the output connector including
means for storing an association of each user channel with only one of the plurality of input connectors; and
means for storing a programmable look-up table of user channel numbers with associated input connectors.

12. The television input signal interface circuit of claim 11 in which the look-up table is stored in an interchangeable read only memory.

13. A television input signal interface circuit, comprising:
a plurality of input connectors for connection to a plurality of different sources of television input signals;
an input connector for connection to an input terminal of a television monitor;
a user channel selector for selecting a plurality of different channels;
means responsive to the user channel selector for automatically selectively coupling the television input signals from different ones of the plurality of input connectors to the output connector including means for storing an association of each user channel with a preselected source channel;
a remote control unit; and
a remote interface circuit for interfacing control signals from the remote control unit with the channel selector to enable remote control of all of a direct broadcast converter/tuner connected to one of the input connectors, a local network broadcast tuner connected to another one of the input connectors and the channel selector responsive means.

14. A method of interfacing a plurality of television signal sources with a television monitor, comprising the steps of:
preassociating each of a plurality of selectable user channels with a selected one of the plurality of television input signal sources, including the steps of
connecting said plurality of television signal sources to a plurality of input connectors, and
storing an association of each of the plurality of selectable user channels with a selected one of a plurality of input connectors, including the steps of
storing the association on one of a plurality of interchangeable memory media; and
changing the association by on-screen programming;
selecting one of the plurality of user channels as a selected channel; and
automatically coupling to the television monitor television input signals from the television signal source preassociated with the selected user channel.

15. The method of claim 14 including the step of
storing associations of the plurality of selectable user channels with selected source channels, respectively.

16. A method of interfacing a plurality of television signal sources with a television monitor, comprising the steps of:
preassociating each of a plurality of selectable user channels with a selected one of the plurality of television input signal sources, including the steps of
connecting said plurality of television signal sources including a direct broadcast satellite television signal and a local network broadcast signal, to a plurality of input connectors, and
storing an association of each of the plurality of selectable user channels with a selected one of a plurality of input connectors;
selecting one of the plurality of user channels as a selected channel;
automatically coupling to the television monitor television input signals from the television signal source preassociated with the selected user channel;
passing the direct broadcast satellite television signals through a direct broadcast satellite converter prior to coupling to the television when a user channel associated with the direct broadcast satellite has been selected; and
passing the local network broadcast television signal directly to the television through a local public broadcast tuner and bypassing the converter when a user channel associated with the public broadcast network is selected.

17. The method of claim 16 in which the step of selecting is performed remotely to remotely automatically control the coupling of the plurality of television signal sources to the television from the direct broadcast satellite tuner and the public broadcast tuner.

18. The method of claim 16 including the step of
converting all of the television signals to a frequency associated with a preselected open channel to which the television is tuned from all the television signal sources with a single converter.

* * * * *